(12) United States Patent
Zhang et al.

(10) Patent No.: US 11,356,957 B2
(45) Date of Patent: Jun. 7, 2022

(54) UPLINK POWER CONTROL METHOD AND TERMINAL

(71) Applicant: Huawei Technologies Co., Ltd., Shenzhen (CN)

(72) Inventors: Xingwei Zhang, Beijing (CN); Shulan Feng, Beijing (CN); Guanglong Du, Beijing (CN); Chao Li, Beijing (CN); Jie Shi, Shenzhen (CN)

(73) Assignee: Huawei Technologies Co., Ltd., Shenzhen (CN)

(\*) Notice: Subject to any disclaimer, the term of this patent is extended or adjusted under 35 U.S.C. 154(b) by 3 days.

(21) Appl. No.: 16/503,078

(22) Filed: Jul. 3, 2019

(65) Prior Publication Data

US 2019/0327686 A1  Oct. 24, 2019

Related U.S. Application Data

(63) Continuation of application No. PCT/CN2017/116578, filed on Dec. 15, 2017.

(30) Foreign Application Priority Data

Jan. 6, 2017 (CN) .......................... 201710011398.2

(51) Int. Cl.
*H04W 52/14* (2009.01)
*H04W 52/36* (2009.01)

(52) U.S. Cl.
CPC ....... *H04W 52/146* (2013.01); *H04W 52/367* (2013.01)

(58) Field of Classification Search
CPC ................ H04B 7/0404; H04B 7/0456; H04B 7/0408; H04B 7/0617; H04B 7/2643; H04L 1/00;

(Continued)

(56) References Cited

U.S. PATENT DOCUMENTS

2012/0004007 A1\* 1/2012 Zhou .................. H04W 52/242
455/522
2013/0023300 A1\* 1/2013 Tani ...................... H04W 74/04
455/522

(Continued)

FOREIGN PATENT DOCUMENTS

CN 104619000 A 5/2015
CN 104812029 A 7/2015

(Continued)

OTHER PUBLICATIONS

"UL Power Control Aspects," 3GPP TSG RAN WG1 Meeting #87, Reno, USA, R1-1612518, XP051176465, pp. 1-4, 3rd Generation Partnership Project, Valbonne, France (Nov. 14-18, 2016).

(Continued)

*Primary Examiner* — Zhitong Chen
(74) *Attorney, Agent, or Firm* — Leydig, Voit & Mayer, Ltd.

(57) ABSTRACT

Embodiments of this application provide an uplink power control method and a terminal. The method includes: obtaining, by a terminal, a power control impact factor, where the power control impact factor includes at least one of the following: beamforming information, a subcarrier spacing, a time length, or a service type; determining, by the terminal, a transmit power of an uplink channel based on the power control impact factor; and sending, by the terminal, the uplink channel at the transmit power of the uplink channel. The embodiments can improve uplink power control precision.

20 Claims, 5 Drawing Sheets

(58) Field of Classification Search
CPC ....... H04L 1/1812; H04L 5/0048; H04L 5/14;
H04W 24/10; H04W 52/0216; H04W
52/02; H04W 52/04; H04W 52/146;
H04W 52/16; H04W 52/18; H04W
52/242; H04W 52/243; H04W 52/245;
H04W 52/246; H04W 52/281; H04W
52/34; H04W 52/346; H04W 52/367;
H04W 52/38; H04W 52/42; H04W 16/28;
H04W 72/02; H04W 72/0408; H04W
72/044; H04W 72/046; H04W 72/0473;
H04W 72/12; H04W 72/1278
USPC ......................................................... 455/522
See application file for complete search history.

(56) References Cited

U.S. PATENT DOCUMENTS

| | | | | |
|---|---|---|---|---|
| 2013/0058315 | A1* | 3/2013 | Feuersanger | H04W 74/006 |
| | | | | 370/336 |
| 2014/0185481 | A1 | 7/2014 | Seol et al. | |
| 2014/0242988 | A1 | 8/2014 | Yang et al. | |
| 2015/0055518 | A1* | 2/2015 | Park | H04B 7/2643 |
| | | | | 370/280 |
| 2016/0105886 | A1* | 4/2016 | Li | H04W 4/70 |
| | | | | 370/329 |
| 2016/0205633 | A1* | 7/2016 | Mizusawa | H04W 52/146 |
| | | | | 455/522 |
| 2016/0212711 | A1 | 7/2016 | Yi | |
| 2016/0323887 | A1* | 11/2016 | Patel | H04W 52/146 |
| 2017/0273079 | A1* | 9/2017 | Park | H04L 5/0094 |
| 2018/0049164 | A1* | 2/2018 | Wu | H04W 72/12 |
| 2018/0077651 | A1* | 3/2018 | Nory | H04L 5/0007 |
| 2018/0242265 | A1* | 8/2018 | Larsson | H04W 52/60 |
| 2018/0249433 | A1* | 8/2018 | Shin | H04L 27/0014 |
| 2019/0320397 | A1* | 10/2019 | Tang | H04W 24/10 |
| 2019/0349864 | A1* | 11/2019 | Zhang | H04W 52/325 |

FOREIGN PATENT DOCUMENTS

| | | |
|---|---|---|
| CN | 105009652 A | 10/2015 |
| CN | 105122900 A | 12/2015 |
| CN | 106102150 A | 11/2016 |
| EP | 2882236 A1 | 6/2015 |
| WO | 2011038548 A1 | 4/2011 |

OTHER PUBLICATIONS

"Views on UL Transmit Power Control for NR," 3GPP TSG RAN WG1 Meeting #87, Reno, USA, R1-1612711, XP051176654, pp. 1-4, 3rd Generation Partnership Project, Valbonne, France (Nov. 14-18, 2016).

* cited by examiner

UPLINK POWER CONTROL METHOD AND TERMINAL

CROSS-REFERENCE TO RELATED APPLICATIONS

This application is continuation of International Application No. PCT/CN2017/116578, filed on Dec. 15, 2017, which claims priority to Chinese Patent Application 201710011398.2, filed on Jan. 6, 2017. The disclosures of the aforementioned applications are hereby incorporated by reference in their entireties.

TECHNICAL FIELD

Embodiments of this application relate to the field of communications technologies, and in particular, to an uplink power control method and a terminal.

BACKGROUND

Power control is an important technology in a wireless communications system and may be used to compensate for various attenuation impact on a channel so that a radio signal can reach a receiver at a proper power.

In a Long Term Evolution (LTE) system, power control includes uplink power control and downlink power control. Uplink power control means controlling transmit powers of different uplink channels. During uplink power control, a physical uplink control channel (PUCCH), a physical uplink shared channel (PUSCH), and a sounding reference signal (SRS) all have definite power control formulas.

In a new radio access technology (NR) of 5th Generation Mobile Communication (5G), many factors affect power control. However, an existing power control manner does not take different impact factors into consideration. If an existing power control method is used, uplink power control may not be precise enough, thereby reducing uplink transmission quality.

SUMMARY

Embodiments of this application provide an uplink power control method and a device. In the embodiments, an uplink power can be determined based on various power control impact factors, improving uplink power control precision and improving uplink transmission quality.

According to a first aspect, an embodiment of this application provides an uplink power control method, including:

obtaining, by a terminal, a power control impact factor, where the power control impact factor includes at least one of the following: beamforming information, a subcarrier spacing, a time length, or a service type, where the beamforming information may be beamforming indication signaling sent on an uplink channel, or may be an identifier of a beam in which an uplink channel is located, the subcarrier spacing is a subcarrier spacing of a resource that carries the uplink channel, the time length is a time length of the resource that carries the uplink channel, or the service type is a service type of uplink information sent on the uplink channel; determining, by the terminal, a transmit power of the uplink channel based on the power control impact factor; and sending, by the terminal, the uplink channel at the transmit power of the uplink channel.

In a possible design, the determining, by the terminal, a transmit power of an uplink channel based on the power control impact factor includes:

determining, by the terminal, power control information based on the power control impact factor, where the power control information includes at least one of the following information: a scaling coefficient, an offset, or a power control parameter attribute; and determining, by the terminal, the transmit power of the uplink channel based on the power control information.

A person skilled in the art may understand that, when the power control impact factor includes one of the beamforming information, the subcarrier spacing, the time length, or the service type, each power control impact factor may correspond to its respective power control information, or when the power control impact factor includes at least two of the beamforming information, the subcarrier spacing, the time length, or the service type, at least two types of power control impact factors may correspond to one piece of power control information.

In a possible design, if the power control impact factor includes the beamforming information, the determining, by the terminal, a transmit power of the uplink channel based on the power control impact factor includes:

determining, by the terminal, power control information based on the beamforming information, where the power control information includes an uplink control information bit function or an uplink control information format function; and determining, by the terminal, the transmit power of the uplink channel based on the uplink control information bit function or the uplink control information format function.

In a possible design, if the power control impact factor includes the beamforming information and the subcarrier spacing, the determining, by the terminal, a transmit power of the uplink channel based on the power control impact factor includes:

determining, by the terminal, first power control information based on the beamforming information, where the first power control information includes an uplink control information bit function or an uplink control information format function;

determining, by the terminal, second power control information based on the subcarrier spacing, where the second power control information includes at least one of the following information: a scaling coefficient, an offset, or a power control parameter attribute; and determining, by the terminal, the transmit power of the uplink channel based on the first power control information and the second power control information.

In a possible design, the determining, by the terminal, power control information based on the power control impact factor includes:

determining, by the terminal based on a preset mapping relationship, power control information corresponding to the power control impact factor, where the preset mapping relationship is configured by a base station for the terminal and the preset mapping relationship includes a mapping relationship between different power control impact factors and the power control information.

In a possible design, if at least two different uplink channels are sent simultaneously and an uplink transmit power is limited, the method further includes:

determining, by the terminal, priorities of the at least two uplink channels in power control based on the power control impact factor; and performing, by the terminal, power control on a transmit power of the at least two uplink channels based on the priorities of the at least two uplink channels in power control.

When there is one type of power control impact factor, priorities of at least two uplink channels in power control are determined based on a plurality of power control factors of the type. For example, for a plurality of subcarrier spacings, a longer subcarrier spacing indicates a higher priority of a corresponding uplink channel.

When there are a plurality of power control impact factors, priorities of the power control impact factors may be sorted. For example, if a sequence of priorities from high to low is: the subcarrier spacing, the beamforming information, the time length, or the service type, subcarrier spacings are preferentially used to determine the priorities of the at least two uplink channels in power control; if the subcarrier spacings are the same, beamforming information is further used to determine priorities of the uplink channels in power control; and so on.

In a possible design, if at least two different uplink channels are sent simultaneously and an uplink transmit power is limited, the method further includes:

determining, by the terminal, priorities of the at least two uplink channels in power control based on an uplink channel type, where when the uplink channels correspond to a same uplink channel type, priorities of the uplink channels in power control are determined based on the power control impact factor, where for a specific determining process, reference may be made to the foregoing description; and performing, by the terminal, power control on a transmit power of the at least two uplink channels based on the priorities of the at least two uplink channels in power control.

In a possible design, the power control impact factor is configured by the base station for the terminal.

In a possible design, the uplink channel includes at least one of the following channels:

a physical uplink control channel PUCCH, a physical uplink shared channel PUSCH, a physical random access channel PRACH, a sounding reference signal SRS, or a physical beamforming channel PBFCH.

In a possible design, if the uplink channel is a physical beamforming channel PBFCH and if the power control impact factor includes beamforming information, an offset determined by the terminal based on the beamforming information is an offset between the PBFCH and a PUCCH; or an offset determined by the terminal based on the beamforming information is an offset between the PBFCH and a PUSCH; or a power headroom of the terminal is obtained through calculation based on a transmit power of the PBFCH.

In a possible design, the PBFCH has the highest priority; and/or the PUSCH includes a PUSCH with grant and a PUSCH without grant, and the PUSCH with grant has a higher priority than the PUSCH without grant.

According to a second aspect, an embodiment of this application provides an uplink power control method, including:

sending, by a base station, a power control impact factor to a terminal, so that the terminal determines a transmit power of an uplink channel based on the power control impact factor; and receiving, by the base station, the uplink channel that is sent by the terminal at the determined transmit power of the uplink channel.

In a possible design, before the receiving, by the base station, the uplink channel that is sent by the terminal at the determined transmit power of the uplink channel, the method further includes:

sending, by the base station, a preset mapping relationship to the terminal, where the preset mapping relationship includes: a mapping relationship between different power control impact factors and power control information.

According to a third aspect, an embodiment of this application provides a terminal, including:

an obtaining module, configured to obtain a power control impact factor, where the power control impact factor includes at least one of the following: beamforming information, a subcarrier spacing, a time length, or a service type;

a processing module, configured to determine a transmit power of an uplink channel based on the power control impact factor; and a sending module, configured to send the uplink channel at the transmit power of the uplink channel.

In a possible design, the processing module is specifically configured to:

determine power control information based on the power control impact factor, where the power control information includes at least one of the following information: a scaling coefficient, an offset, or a power control parameter attribute; and determine the transmit power of the uplink channel based on the power control information.

In a possible design, if the power control impact factor includes the beamforming information, the processing module is specifically configured to:

determine power control information based on the beamforming information, where the power control information includes an uplink control information bit function or an uplink control information format function; and determine the transmit power of the uplink channel based on the uplink control information bit function or the uplink control information format function.

In a possible design, if the power control impact factor includes the beamforming information and the subcarrier spacing, the processing module is specifically configured to:

determine first power control information based on the beamforming information, where the first power control information includes an uplink control information bit function or an uplink control information format function;

determine second power control information based on the subcarrier spacing, where the second power control information includes at least one of the following information: a scaling coefficient, an offset, or a power control parameter attribute; and determine the transmit power of the uplink channel based on the first power control information and the second power control information.

In a possible design, the processing module is specifically configured to:

determine, based on a preset mapping relationship, power control information corresponding to the power control impact factor, where the preset mapping relationship is configured by a base station for the terminal and the preset mapping relationship includes a mapping relationship between different power control impact factors and power control information.

In a possible design, if at least two different uplink channels are sent simultaneously and an uplink transmit power is limited, the terminal further includes: a power control module, where the power control module is configured to: determine priorities of the at least two uplink channels in power control based on the power control impact factor; and perform power control on a transmit power of the at least two uplink channels based on the priorities of the at least two uplink channels in power control.

In a possible design, if at least two different uplink channels are sent simultaneously and an uplink transmit power is limited, the terminal further includes: a power control module, where the power control module is configured to: determine priorities of the at least two uplink channels in power control based on an uplink channel type, where when the uplink channels correspond to a same uplink channel type, priorities of the uplink channels in power control are determined based on the power control impact factor; and perform power control on a transmit power of the at least two uplink channels based on the priorities of the at least two uplink channels in power control.

In a possible design, when the power control impact factor is the subcarrier spacing, a longer subcarrier spacing indicates a higher priority of a corresponding uplink channel.

According to a fourth aspect, an embodiment of this application provides a base station, including:

a sending module, configured to send a power control impact factor to a terminal, so that the terminal determines a transmit power of an uplink channel based on the power control impact factor; and a receiving module, configured to receive the uplink channel that is sent by the terminal at the determined transmit power of the uplink channel.

According to a fifth aspect, an embodiment of this application provides a terminal, including: at least one processor and a memory, where the memory stores a computer executable instruction; and the at least one processor executes the computer executable instruction stored in the memory, so that the terminal performs the foregoing uplink power control method.

According to a sixth aspect, an embodiment of this application provides a computer-readable storage medium, where the computer-readable storage medium stores a computer executable instruction and implements the foregoing uplink power control method when a processor executes the computer executable instruction.

According to the uplink power control method provided in this embodiment, the terminal obtains the power control impact factor, and determines the transmit power of the uplink channel based on the specific power control impact factor. The power control impact factor in this embodiment includes at least one of the beamforming information, the subcarrier spacing, the time length, or the service type, and the terminal may determine the transmit power based on different power control impact factors, and send the uplink channel at the transmit power of the uplink channel, thereby improving uplink power control precision, and improving uplink transmission quality.

DESCRIPTION OF EMBODIMENTS

A network architecture and a service scenario described in embodiments of this application are intended to describe the technical solutions in the embodiments of this application more clearly, and do not constitute a limitation on the technical solutions provided in the embodiments of this application. A person skilled in the art may learn that, with evolution of the network architecture and appearance of a new service scenario, the technical solutions provided in the embodiments of this application are also applicable to a similar technical problem.

Figure 1:
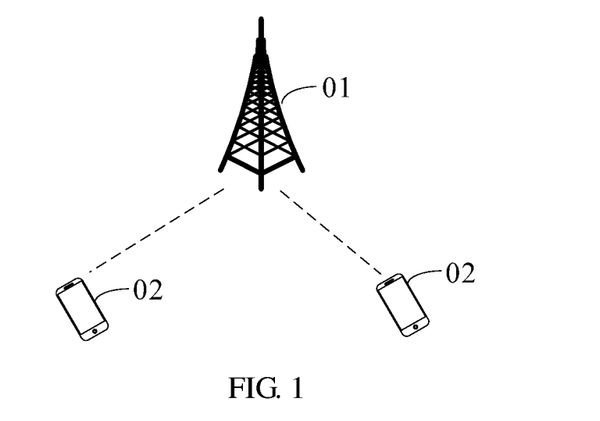
FIG. 1 shows a network architecture that may be applicable to an embodiment of this application.

The following describes in detail a possible network architecture in the embodiments of this application with reference to FIG. 1. FIG. 1 shows a network architecture that may be applicable to an embodiment of this application. As shown in FIG. 1, the network architecture provided in this embodiment of this application includes a base station 01 and a terminal 02. The terminal in this embodiment of this application may include various handheld devices, in-vehicle devices, wearable devices, and computing devices that have a wireless communication function, or other processing devices connected to wireless modems, user equipment and mobile stations (MS) that are in various forms, and the like. The base station (BS) in this embodiment of this application is a network device that is configured to provide a wireless communication function for a terminal and that is deployed in a radio access network. The base station may include a macro base station, a micro base station, a relay station, an access point, and the like in various forms.

Uplink power control in a Long Term Evolution (LTE) system is to compensate for a channel path loss and a shadowing effect. An uplink transmit power is completed by using a power control instruction from the base station. When uplink channel quality of the terminal is relatively low, the base station may instruct the terminal to raise the transmit power. On the contrary, when uplink channel quality of the terminal is relatively high, the base station may instruct the terminal to reduce the transmit power.

In LTE, a physical uplink control channel (PUCCH) and a physical uplink shared channel (PUSCH) both have definite power control formulas, and a sounding reference signal (SRS) is obtained by adding an offset to a transmit power of the PUSCH. The base station may configure a parameter in a formula for the terminal in a semi-static manner, to raise or reduce the transmit power of the terminal.

In a new radio access technology (NR) in 5th generation mobile communication 5G, a new air interface access technology is defined to support a user experience rate of 0.1 to 1 Gbit/s, a density of a quantity of one million connections per square kilometer, a millisecond-level end-to-end latency, a traffic density of tens of Tbps per square kilometer, mobility of over 500 km per hour, and a peak rate of tens of Gbit/s.

Three major application scenarios and requirements of 5G include: enhanced mobile broadband, massive machine type communications, and ultra-reliable and low latency communications. Scenarios corresponding to the ultra-reliable and low latency communications include unmanned driving, industry control, and the like and require a low latency and high reliability. The low latency specifically requires a 0.5-ms end-to-end latency and a 1-ms latency for air interface information exchange, and high reliability specifically requires that a block error rate (BLER) should reach $10^{-5}$. In other words, a percentage of correct data packet receiving should reach 99.999%.

Based on the 5G application scenarios and requirements, in the 5G NR, a plurality of subcarrier spacings (SCS) are introduced. For example, when a baseline is 15 kHz, subcarrier spacings may be 3.75 kHz, 7.5 kHz, 15 kHz, and $15\times2^n$ kHz, where n is an integer, until 480 kHz, with a maximum of eight subcarrier spacings. Accordingly, there are a plurality of symbol lengths and subframe lengths.

Further, when the base station works in a high frequency scenario with severe attenuation and a small coverage area, to resolve a coverage problem, in the 5G NR, beamforming usage and beam management are enhanced. Beamforming indication (BFI) reporting is introduced in the 5G. To be specific, the terminal reports a beam identifier (Beam ID) of a measurement result or a best measurement result to the base station by measuring a downlink beamforming reference signal BRS (Beamforming RS) sent by the base station. The Beam ID is carried in a BFI. The BFI may be carried on a PUCCH, or may be carried on a PUSCH. Alternatively, a separate channel such as a physical beamforming channel (PBFCH) carries the BFI.

However, in an existing LTE system, during uplink power control, a scenario of a plurality of different subcarrier spacings and a possible power consumed for BFI reporting are not considered. Based on this, an embodiment provides an uplink power control method, so that uplink power control is applicable to various subcarrier spacing scenarios and/or BFI reporting. The following uses detailed embodiments to describe the uplink power control method provided in this embodiment in detail.

Figure 2:
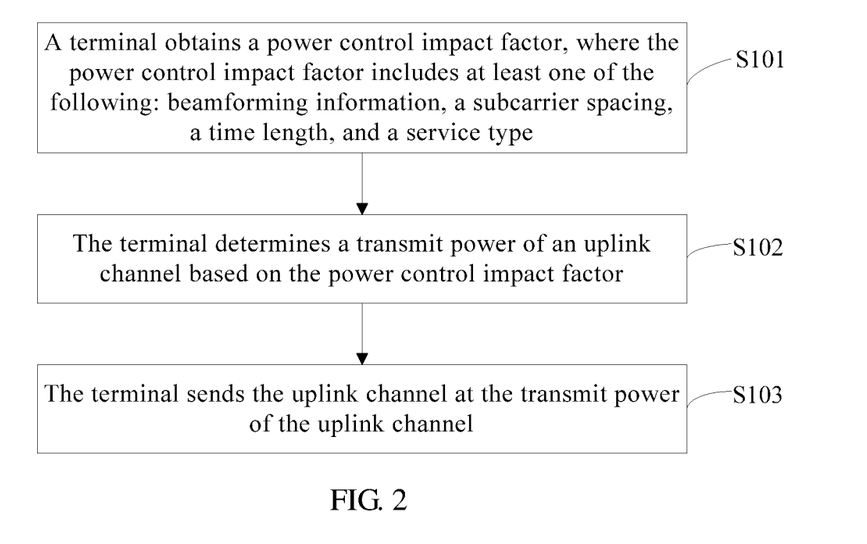
FIG. 2 is a flowchart 1 of an uplink power control method according to an embodiment of this application.

FIG. 2 is a flowchart 1 of an uplink power control method according to an embodiment of this application. As shown in FIG. 2, the method includes the following steps.

S101. A terminal obtains a power control impact factor, where the power control impact factor includes at least one of the following: beamforming information, a subcarrier spacing, a time length, or a service type.

The beamforming information in this embodiment may be beamforming indication signaling sent on an uplink channel, or may be an identifier of a beam in which an uplink channel is located, for example, a beam 1, a beam 2, a beam 3, a beam 4, a beam 5, or the like.

The subcarrier spacing in this embodiment is a subcarrier spacing of a resource that carries the uplink channel. The subcarrier spacing may be a physical frequency domain subcarrier spacing, for example, 3.75 kHz, 7.5 kHz, 15 kHz, 30 kHz, 60 kHz, 120 kHz, 240 kHz, or 480 kHz.

The time length in this embodiment is a time length of the resource that carries the uplink channel, for example, a symbol length, a slot length, or a subframe length. For another example, a long physical uplink control channel (PUCCH) time length may be 0.5 ms or 1 ms, a short PUCCH time length may be one symbol, two symbols, or the like, and for a 15-kHz subcarrier spacing (SCS), a length of one symbol may be 71 us.

The service type in this embodiment is a service type of uplink information sent on the uplink channel, for example, enhanced mobile broadband, massive machine type communications, and ultra-reliable and low latency communications.

The uplink channel in this embodiment includes at least one of the following channels: a PUCCH, a PUSCH, a physical random access channel (PRACH), an SRS, or a PBFCH. To be specific, in this embodiment, the terminal may determine the subcarrier spacing of the resource that carries the uplink channel. When there are a plurality of uplink channels and there are a plurality of resources that carry the uplink channels, subcarrier spacings corresponding to the resources may be the same, or may be different. The resource may be, for example, a time domain resource, a frequency domain resource, a spatial resource, a code domain resource, or a power domain resource.

The foregoing power control impact factor may be configured by a base station for the terminal. For example, the base station may send configuration information to the terminal, where the configuration information includes the power control impact factor. The terminal may obtain the power control impact factor based on the configuration information.

In a specific example, the configuration information sent by the base station to the terminal may be specifically semi-static configuration information. To be specific, the configuration information may be valid in a period of time, and the base station does not need to frequently send the configuration information to the terminal. The base station may directly send the configuration information to the terminal, or may add the configuration information to other information. For a specific implementation of sending the configuration information to the terminal by the base station, details are not described herein again in this embodiment.

Specifically, for power control impact factors of a same type, the base station may directly configure a power control impact factor for the terminal. Alternatively, the base station may configure a plurality of power control impact factors for the terminal, and the terminal selects a current power control impact factor from the plurality of power control impact factors.

The beamforming information is used as an example. The configuration information may include a plurality of pieces of beamforming information. To be specific, the plurality of pieces of beamforming information correspond to a plurality of beam identifiers. The terminal may select one beam from the plurality of beam identifiers to obtain the beamforming information. Further, the terminal may alternatively use the foregoing method. To be specific, the terminal measures a BRS sent by the base station and obtains the beamforming information based on a measurement result. The configuration information may also include a plurality of subcarrier spacings, and the terminal may select one subcarrier spacing from the plurality of subcarrier spacings.

S102. The terminal determines a transmit power of an uplink channel based on the power control impact factor.

After obtaining the beamforming information, the terminal may search, based on a preset mapping relationship or a preset protocol table, for power control information corresponding to the beamforming information and then obtains the transmit power of the uplink channel based on the power control information. The preset mapping relationship or the preset protocol table includes power control information corresponding to a plurality of beam identifiers.

After obtaining the subcarrier spacing, the terminal may search, based on a preset mapping relationship or a preset protocol table, for power control information corresponding to the subcarrier spacing and then obtains the transmit power of the uplink channel based on the power control information. The preset mapping relationship or the preset protocol table includes power control information corresponding to a plurality of subcarrier spacings.

After obtaining the time length, the terminal may search, based on a preset mapping relationship or a preset protocol table, for power control information corresponding to the time length and then obtains the transmit power of the uplink channel based on the power control information. The preset mapping relationship or the preset protocol table includes power control information corresponding to a plurality of time lengths.

After obtaining the service type, the terminal may search, based on a preset mapping relationship or a preset protocol table, for power control information corresponding to the service type and then obtains the transmit power of the uplink channel based on the power control information. The preset mapping relationship or the preset protocol table includes power control information corresponding to a plurality of service types.

A person skilled in the art may understand that, when the power control impact factor includes one of the beamforming information, the subcarrier spacing, the time length, or the service type, each power control impact factor may correspond to its respective power control information, or when the power control impact factor includes at least two of the beamforming information, the subcarrier spacing, the time length, or the service type, at least two types of power control impact factors may correspond to one piece of power control information.

The foregoing power control information may be specifically a scaling coefficient, an offset, a power control parameter attribute, an uplink control information function, or the like in a preset formula.

S103. The terminal sends the uplink channel at the transmit power of the uplink channel.

After the terminal determines the transmit power of the uplink channel, the terminal sends the uplink channel to the base station at the transmit power. The base station receives the uplink channel sent by the terminal.

According to the uplink power control method provided in this embodiment, the terminal obtains the power control impact factor, and determines the transmit power of the uplink channel based on the specific power control impact factor. The power control impact factor in this embodiment includes at least one of the beamforming information, the subcarrier spacing, the time length, or the service type, and the terminal may determine the transmit power based on different power control impact factors, and send the uplink channel at the transmit power of the uplink channel, thereby improving uplink power control precision, and improving uplink transmission quality.

The following uses several specific embodiments to describe the foregoing uplink power control method in detail.

(1) In a possible implementation, the terminal determines power control information based on the power control impact factor, where the power control information includes at least one of the following information: a scaling coefficient, an offset, or a power control parameter attribute; and the terminal determines the transmit power of the uplink channel based on the power control information.

Specifically, the terminal determines the power control information based on the beamforming information, or the subcarrier spacing, or the time length, or the service type. The following uses the subcarrier spacing and the beamforming information as an example for description.

In a possible example, the terminal determines, based on a preset mapping relationship, power control information corresponding to the subcarrier spacing, where the preset mapping relationship is configured by the base station for the terminal and the preset mapping relationship includes a mapping relationship between different subcarrier spacings and power control information.

In a specific implementation process, the mapping relationship may be the mapping relationship between different subcarrier spacings and power control information. Specifically, each subcarrier spacing is mapped to a different scaling coefficient, a different offset, and a different power control parameter attribute. The terminal may determine, based on the mapping relationship, the power control information corresponding to the subcarrier spacing and then obtains the transmit power of the uplink channel based on the power control information and a power control formula that corresponds to each uplink channel.

A person skilled in the art may understand that, the preset mapping relationship configured by the base station for the terminal may be static. In other words, the preset mapping relationship can be used permanently once configured. Alternatively, the preset mapping relationship may be configured to be semi-static. In other words, the preset mapping relationship can be used for a period of time, and then the base station updates the preset mapping relationship based on current channel quality. The following uses a PUCCH as an example, and uses several specific embodiments to describe implementations of obtaining, by the terminal, the transmit power of the uplink channel based on the power control information.

Before description, a PUCCH power control formula in the prior art is first described.

$$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\} \quad \text{formula 1}$$

$P_{PUCCH}(i)$ indicates a transmit power of a PUCCH channel in a subframe i. $P_{CMAX,c}$ indicates a maximum transmit power of a terminal on a carrier c. $P_{0\_PUCCH}$ indicates an open loop power of the PUCCH channel. PLc (Path Loss) indicates a path loss on the carrier c. $\Delta_{F\_PUCCH}(F)$ indicates compensation for different PUCCH formats. $h(n_{CQI}, n_{HARQ}, n_{SR})$ is compensation for different quantities of bits of uplink control information (UCI) of a same PUCCH format. $g(i)$ indicates a power control dynamic offset.

$$g(i) = g(i-1) + \sum_{m=0}^{M-1} \delta_{PUCCH}(i - k_m)$$

indicates an accumulated amount of transmit power control (TPC) of the uplink subframe i relative to an uplink subframe i−1. $\delta_{PUCCH}$ is a closed-loop correction coefficient indicated by a TPC power control command in DL grant (downlink scheduling signaling DCI Format 1/1A/1B/1D/2/2A/2B) or DCI Format 3/3A.

In a possible example, to maintain coexistence of a subcarrier spacing below 6 GHz and an LTE system, a subcarrier spacing of 15 kHz uses an existing LTE power control mechanism and calculation formula, and power control of another subcarrier spacing may use another manner for implementation. The following provides detailed description.

Solution 1: A 15-kHz subcarrier spacing is used as a reference, and another subcarrier spacing is a 15-kHz transmit power multiplied by a scaling coefficient KSCS.

$$P_{PUCCH}(i) = \min\left\{K_{SCS} * \begin{bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{bmatrix}\right\} \quad \text{formula 2}$$

Optionally, when a subcarrier spacing is greater than 15 kHz, the scaling coefficient is greater than 1; or when a subcarrier spacing is less than 15 kHz, the scaling coefficient is less than 1. The scaling coefficient may be proportional to a value of a subcarrier spacing.

Solution 2: For different subcarrier spacings, an offset is added to the end of a power control formula as a compensation term.

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) + \Delta_{SCS} \end{array}\right\} \quad \text{formula 3}$$

Optionally, when a subcarrier spacing is greater than 15 kHz, the offset is greater than 0; or when a subcarrier spacing is less than 15 kHz, the offset is less than 0. The offset may be proportional to a value of a subcarrier spacing.

Solution 3: Different subcarrier spacings use different power control parameters. To be specific, the foregoing power control parameter attribute is specifically a parameter value of a preset power control parameter.

$$P_{PUCCH,scs}(i) = \min\left\{\begin{array}{l} P_{CMAX,c,scs}(i), \\ P_{0\_PUCCH,scs} + h(n_{CQI}, n_{HARQ}, n_{SR}) + \\ \Delta_{F\_PUCCH}(F) + \Delta_{TxD}(F') + g(i) \end{array}\right\} \quad \text{formula 4}$$

In formula 4, $P_{CMAX,c,scs}(i)$, $P_{0\_PUCCH,scs}$ and $PL_{c,scs}$ are preset power control parameters. A different subcarrier spacing corresponds to a different power control parameter value.

Solution 4: A subcarrier spacing is used as a coefficient $a_{scs}$ of an existing term such as PL. To be specific, the foregoing power control parameter attribute is specifically a coefficient of a preset power control parameter.

$$P_{PUCCH}(i) = \min\left\{\begin{array}{l} P_{CMAX,c}(i), \\ P_{0\_PUCCH} + a_{scs}PL_c + h(n_{CQI}, n_{HARQ}, n_{SR}) + \\ \Delta_{F\_PUCCH}(F) + \Delta_{TxD}(F') + g(i) \end{array}\right\} \quad \text{formula 5}$$

A person skilled in the art may understand that in a specific implementation process, the foregoing several solutions may be used separately, or a combination of the foregoing several solutions may be used. The foregoing merely shows implementations of the power control formula for the PUCCH. An implementation principle of a power control formula of another uplink channel is similar thereto. Details are not described herein again in this embodiment.

In another possible example, the terminal determines, based on a preset mapping relationship, power control information corresponding to the beamforming information, where the preset mapping relationship is configured by the base station for the terminal and the preset mapping relationship includes a mapping relationship between different beamforming information and power control information.

In a specific implementation process, the preset mapping relationship may be a mapping relationship between different beamforming information and power control information. Specifically, each beam is mapped to a different scaling coefficient, a different offset, and a different power control parameter attribute. The terminal may determine, based on the preset mapping relationship, the power control information corresponding to the beamforming information and then obtain the transmit power of the uplink channel based on the power control information and a power control formula that corresponds to each uplink channel.

A person skilled in the art may understand that, the preset mapping relationship configured by the base station for the terminal may be static. In other words, the preset mapping relationship can be used permanently once configured. Alternatively, the preset mapping relationship may be configured to be semi-static. In other words, the preset mapping relationship can be used for a period of time, and then the base station updates the preset mapping relationship based on current channel quality.

The following uses a PUCCH as an example, and uses several specific embodiments to describe implementations of obtaining, by the terminal, the transmit power of the uplink channel based on the power control information.

In this embodiment, the foregoing formula 1 is still used as an example for detailed description.

Solution 1: For different beams, an offset is added to the end of a power control formula as a compensation term.

$$P_{PUCCH}(i) = \min\left\{\begin{array}{l} P_{CMAX,c}(i), \\ P_{0\_PUCCH} + PL_c + h(n_{CSI}, n_{HARQ}, n_{SR}) + \\ \Delta_{F\_PUCCH}(F) + \Delta_{TxD}(F') + \Delta_{BF}(BFI) + g(i) \end{array}\right\} \quad \text{formula 6}$$

$A_{BF}$ (BFI) is a related power compensation term, namely, a power required for reporting a BFI to the base station by the terminal.

Solution 2: A BFI is reflected in a PUCCH format related power control term $\Delta_{F\_PUCCH}$ (F).

Solution 3: Different BFIs use different power control parameters or coefficients. To be specific, the foregoing power control parameter attribute is specifically a parameter value of a preset power control parameter and a coefficient of the preset power control parameter.

$$P_{PUCCH,b}(i) = \min\left\{\begin{array}{l} P_{CMAX,c,b}(i), \\ P_{0\_PUCCH,b} + \alpha_b PL_{c,b} + h(n_{CSI}, n_{HARQ}, n_{SR}, n_{BFI}) + \\ \Delta_{F\_PUCCH}(F) + \Delta_{TxD}(F') + g(i) \end{array}\right\} \quad \text{formula 7}$$

$P_{CMAX,c,b}(i)$, $P_{0\_PUCCH,b}$, and $PL_{c,b}$ are preset power control parameters, and $\alpha_b$ is a power control coefficient.

Optionally, the following further uses a PUSCH as an example to describe some embodiments. A PUSCH power control formula is shown in the following formula 8:

$$P_{PUSCH,c}(i) = \min\left\{\begin{array}{l} P_{CMAX,c}(i), \\ 10\log_{10}(M_{PUSCH,c}(i)) + P_{0\_PUSCH,c}(j) + \\ \alpha_c(j) \cdot PL_c + \Delta_{TF,c}(i) + f_c(i) \end{array}\right\} \quad \text{formula 8}$$

$P_{PUSCH,c}(i)$ indicates a transmit power of a PUSCH channel on a carrier c in a subframe i. $P_{CMAX,c}$ indicates a maximum transmit power of the terminal on the carrier c. $M_{PUSCH,c}(i)$ indicates PUSCH channel bandwidth. $P_{O\_PUSCH,c}(j)$ indicates an open loop power of the PUSCH channel. PLc (Path Loss) indicates a path loss on the carrier c. $\alpha_c(j)$ indicates a compensation factor of the path loss on the carrier c. $\Delta_{TF,c}(i)$ indicates compensation for different transmission formats. $f_c(i)$ indicates a closed-loop power control adjustment value.

A person skilled in the art may understand that, because a BFI uses data puncturing, which does not affect PUSCH bandwidth, the BFI may be used together with data to perform power control.

Optionally, the BFI may be further carried on a PUSCH. A corresponding PUSCH power formula may have some changes, and a specific implementation is similar to an implementation of carrying the BFI on a PUCCH. Details are as follows:

Solution 1: For different beams, an offset is added to the end of a power control formula as a compensation term.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + \Delta_{BF}(BFI) + f_c(i) \end{Bmatrix} \quad \text{formula 9}$$

$\Delta_{BF}(BFI)$ is a related power compensation term, namely, a power required for reporting a BFI to the base station by the terminal.

Solution 3: Different BFIs use different power control parameters or coefficients. To be specific, the foregoing power control parameter attribute is specifically a parameter value of a preset power control parameter and a coefficient of the preset power control parameter.

$$P_{PUSCH,c,b}(i) = \min\begin{Bmatrix} P_{CMAX,c,b}(i), \\ 10\log_{10}(M_{PUSCH,c,b}(i)) + P_{O\_PUSCH,c,b}(j) + \\ \alpha_{c,b}(j) \cdot PL_{c,b} + \Delta_{TF,c,b}(i) + f_{c,b}(i) \end{Bmatrix} \quad \text{formula 10}$$

The preset power control parameter is indicated by b in a subscript form.

(2) In another possible implementation, the terminal determines power control information based on the beamforming information, where the power control information may be an uplink control information function and the uplink control information function includes an uplink control information bit function or an uplink control information format function; and the terminal determines the transmit power of the uplink channel based on the uplink control information bit function or the uplink control information format function.

In this embodiment, the foregoing PUCCH power control formula is still used as an example for description.

Solution 1: A quantity of BFI bits is considered as a variable of an h function, where the h function is an example of the uplink control information bit function. To be specific, $h(n_{CQI}, n_{HARQ}, n_{SR})$ in the foregoing formula 1 is changed to $h(n_{CQI}, n_{HARQ}, n_{SR}, n_{BFI})$. Alternatively, a quantity of BFI bits may be counted in a quantity of CQIs. To be specific, the quantity of BFI bits is added during calculation of $n_{CQI}$.

$$P_{PUCCH}(i) = \min\begin{Bmatrix} P_{CMAX,c}(i), \\ P_{0\_PUCCH} + PL_c + h(n_{CSI}, n_{HARQ}, n_{SR}, n_{BFI}) + \\ \Delta_{F\_PUCCH}(F) + \Delta_{TxD}(F') + g(i) \end{Bmatrix} \quad \text{formula 11}$$

Solution 2: During BFI reporting, different h functions may be used, where the h functions are examples of the uplink control information format function. For example, for a beam 1, h1 is used; and for a beam 2, h2 is used. To be specific, different beams correspond to different h functions. The foregoing power control information may include a function identifier.

$$h1(n_{CQI}, n_{HARQ}, n_{SR}, n_{BFI,1}) = \begin{cases} 10\log_{10}\left(\dfrac{n_{CQI} + n_{HARQ} + n_{BFI,1} + n_{SR}}{4}\right) & \text{if } n_{CQI} + n_{HARQ} + n_{BFI,1} \geq 4 \\ 0 & \text{otherwise} \end{cases}$$

$$h2(n_{CQI}, n_{HARQ}, n_{SR}, n_{BFI,2}) = \begin{cases} 10\log_{10}\left(\dfrac{n_{CQI} + n_{HARQ} + n_{BFI,2} + n_{SR}}{2}\right) & \text{if } n_{CQI} + n_{HARQ} + n_{BFI,1} \geq 2 \\ 0 & \text{otherwise} \end{cases}$$

Figure 3:
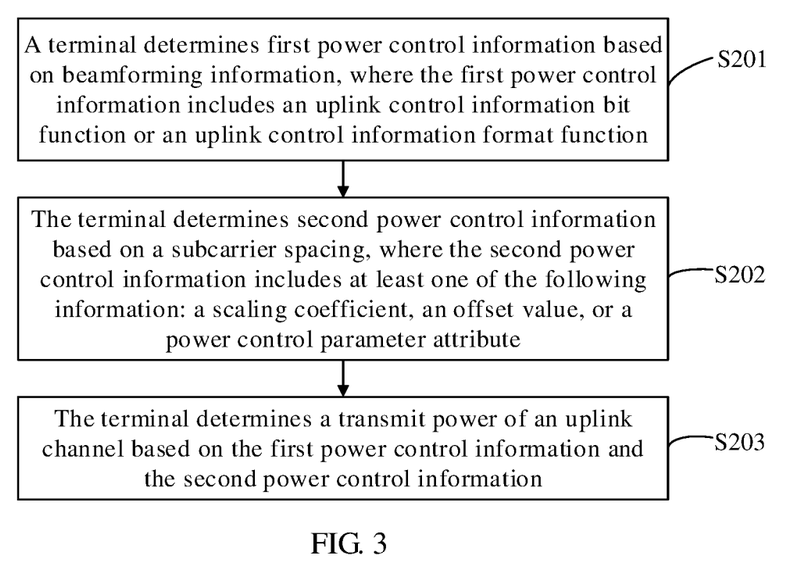
FIG. 3 is a flowchart 2 of an uplink power control method according to an embodiment of this application.

(3) In still another possible implementation, the terminal determines the transmit power of the uplink channel based on the subcarrier spacing and the beamforming information. For details, refer to FIG. 3. FIG. 3 is a flowchart 2 of an uplink power control method according to an embodiment of this application. The method includes the following steps.

S201. A terminal determines first power control information based on beamforming information, where the first power control information includes an uplink control information bit function or an uplink control information format function.

In this embodiment, for a process in which the terminal determines the first power control information, refer to the foregoing h function. An implementation principle and a technical effect thereof are similar thereto. Details are not described herein again in this embodiment.

S202. The terminal determines second power control information based on a subcarrier spacing, where the second power control information includes at least one of the following information: a scaling coefficient, an offset, or a power control parameter attribute.

In this embodiment, for a process in which the terminal determines the second power control information based on the subcarrier spacing, refer to the process of determining the power control information based on the subcarrier spacing in the foregoing embodiment. Details are not described herein again in this embodiment.

S203. The terminal determines a transmit power of an uplink channel based on the first power control information and the second power control information.

It can be learned from the foregoing embodiment that the uplink control information function in the first power control information is mainly the h function. An implementation process of the h function is not affected by the second power control information, and the h function and the second power control information are relatively independent and are not mutually affected. Therefore, in a power control formula, on the basis of using the second power control information, corresponding first power control information may be used. In other words, both the second power control information and the corresponding first power control information are used, to determine the transmit power of the uplink channel.

In this embodiment, both impact of the subcarrier spacing and impact of the BFI on the uplink power may be considered in a process of sending the uplink channel, so that the terminal may determine the uplink power based on different subcarrier spacings and different beamforming information.

(4) In yet another possible implementation, in this embodiment, a new uplink control channel, namely, the foregoing PBFCH is defined, and is used for the terminal to report a BFI. This embodiment provides new uplink control channel PBFCH power control, including transmit power calculation.

In a possible case, the PBFCH and the PUCCH or the PUSCH share a power control parameter. An offset is added on the basis of a transmit power of the PUCCH or the PUSCH, where the offset is a beam-specific parameter configured by the base station. Considering that PUSCH bandwidth may be relatively high but because a PBFCH data size is relatively small, PBFCH bandwidth may be relatively low, if a PUSCH transmit power is used as a reference, a bandwidth difference term is added. The following separately gives detailed descriptions.

An offset determined by the terminal based on the beamforming information is an offset between the PBFCH and the PUCCH. The terminal determines a PBFCH uplink power based on the offset. Details are as follows:

$$P_{PBFCH} = P_{PUCCH} + P_{Offset}$$

$P_{PBFCH}$ represents the PBFCH uplink power, $P_{PUCCH}$ represents a PUCCH uplink power, and $P_{Offset}$ represents the offset.

The offset determined by the terminal based on the beamforming information is an offset between the PBFCH and a PUSCH. The terminal determines a PBFCH uplink power based on the offset. Details are as follows:

$$P_{PBFCH} = P_{PUSCH} - 10 \log M_{PUSCH} + 10 \log M_{PBFCH} + P_{Offset}$$

$P_{PBFCH}$ represents the PBFCH uplink power, $P_{PUSCH}$ represents a PUSCH uplink power, $P_{Offset}$ represents the offset, $M_{PUSCH}$ indicates PUSCH channel bandwidth, and $M_{PBFCH}$ indicates PBFCH channel bandwidth.

In another possible case, power control is separately performed for the PBFCH. A power control parameter of the PBFCH is a beam-specific parameter configured by the base station. Different beams have different power control parameters. For a specific term, refer to the PUCCH or PUSCH power control term. However, considering that a BFI carried on the PBFCH belongs to control information, modification on the basis of the PUCCH transmit power tends to be used.

$$P_{PBFCH,b}(i) = \min \begin{Bmatrix} P_{CMAX,c,b}(i), \\ P_{0\_PBFCH,b} + \alpha_b PL_{c,b} + h(n_{BFI}) + \\ \Delta_{F\_PBFCH,c,b}(F) + \Delta_{TxD}(F') + g(i) \end{Bmatrix} \quad \text{formula 12}$$

$$P_{PBFCH,c,b}(i) = \\ \min \begin{Bmatrix} P_{CMAX,c,b}(i), \\ 10 \log_{10}(M_{PBFCH,c,b}(i)) + p_{0\_PBFCH,c,b}(j) + \\ \alpha_c(j) \cdot PL_c + \Delta_{TF,c}(i) + f_c(i) \end{Bmatrix} \quad \text{formula 13}$$

For a specific meaning of each parameter in formula 12 and formula 13, refer to the foregoing embodiments. Details are not described herein again in this embodiment. A formula term with a subscript PBFCH is for the PBFCH channel.

Optionally, in the foregoing implementation, a power headroom of the terminal is calculated based on a PBFCH transmit power. To be specific, the terminal obtains the power headroom based on a difference between a maximum transmit power configured by the base station and the uplink transmit power.

Based on the foregoing embodiment, if at least two different uplink channels need to be sent simultaneously and the uplink transmit power is limited, after the terminal determines the transmit power of the uplink channel based on the subcarrier spacing and/or the beamforming information, scaling processing needs to be performed on transmit powers of the at least two uplink channel. For details, refer to FIG. 4 and FIG. 5.

Figure 4:
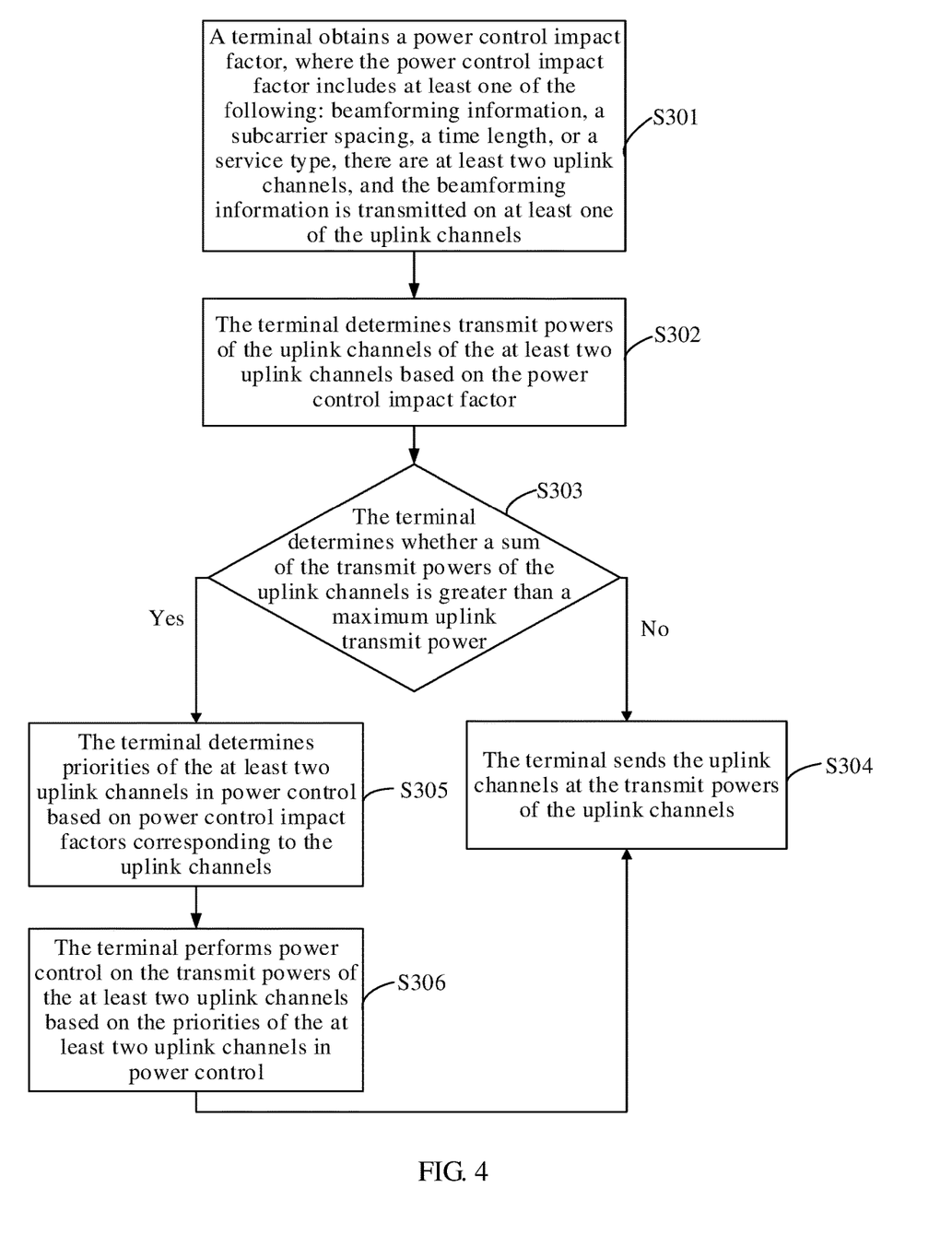
FIG. 4 is a flowchart 3 of an uplink power control method according to an embodiment of this application.

FIG. 4 is a flowchart 3 of an uplink power control method according to an embodiment of this application. As shown in FIG. 4, the method includes the following steps.

S301. A terminal obtains a power control impact factor, where the power control impact factor includes at least one of the following: beamforming information, a subcarrier spacing, a time length, or a service type, there are at least two uplink channels, and the beamforming information is transmitted on at least one of the uplink channels.

In this embodiment, there may be a plurality of uplink channels for uplink transmission, each uplink channel is carried by one resource, and each resource corresponds to one subcarrier spacing. The resources may correspond to same or different subcarrier spacings.

The beamforming information may be carried on one uplink channel, or may be carried on a plurality of uplink channels; in other words, the beamforming information may be dispersed in a plurality of uplink channels. For example, the beamforming information includes a Beam ID (beam identifier), a BFI, a CQI, and the like. Beam ID information and CQI information are carried on an uplink control channel PUCCH, and BFI information is carried on an uplink data channel PUSCH.

S302. The terminal determines transmit powers of the at least two uplink channels based on the power control impact factor.

The terminal may determine the transmit powers of the at least two uplink channels based on the beamforming information. A person skilled in the art may understand that, the terminal may calculate a transmit power of each uplink channel by using an uplink control information bit function based on a quantity of bits that are for the beamforming information and that are carried on each uplink channel. When there are at least two uplink channels, a priority of an uplink channel that carries the beamforming information is relatively high, and a transmit power of the uplink channel that carries the beamforming information is preferentially ensured.

The terminal determines the transmit power of each uplink channel based on subcarrier spacings corresponding to at least two resources. For a specific implementation of determining, by the terminal, a transmit power of an uplink channel corresponding to each subcarrier spacing, refer to the foregoing implementation of determining the transmit power based on the first mapping relationship. Details are not described herein again in this embodiment.

An implementation of determining, by the terminal, the transmit power of the uplink channel based on the beamforming information and the subcarrier spacings corresponding to the at least two resources may be: determining, by the terminal, an uplink control information function based on the beamforming information; determining, by the terminal, power control information based on the subcarrier spacing; and then determining, by the terminal, an uplink power of each channel based on the uplink control information function and the power control information. For details, refer to the embodiment shown in FIG. 2. Details are not described herein again.

The terminal determines transmit powers of the at least two uplink channels based on the time length. A person skilled in the art may understand that, when a plurality of channels are transmitted simultaneously, transmit powers of channels of different time lengths are different.

S303. The terminal determines whether a sum of the transmit powers of the uplink channels is greater than a maximum uplink transmit power, and if the sum of the transmit powers of the uplink channels is not greater than the maximum uplink transmit power, go to S304, or if the sum of the transmit powers of the uplink channels is greater than the maximum uplink transmit power, go to S305. S304. The terminal sends the uplink channels at the transmit powers of the uplink channels.

S305. The terminal determines priorities of the at least two uplink channels in power control based on power control impact factors corresponding to the uplink channels.

When there is one type of power control impact factor, priorities of at least two uplink channels in power control are determined based on a plurality of power control factors of the type. For example, for a plurality of subcarrier spacings, a longer subcarrier spacing indicates a higher priority of a corresponding uplink channel.

When there are a plurality of power control impact factors, priorities of the power control impact factors may be sorted. For example, if a sequence of priorities from high to low is: the subcarrier spacing, the beamforming information, the time length, or the service type, subcarrier spacings are preferentially used to determine the priorities of the at least two uplink channels in power control; if the subcarrier spacings are the same, beamforming information is further used to determine priorities of the uplink channels in power control; and so on.

S306. The terminal performs power control on the transmit powers of the at least two uplink channels based on the priorities of the at least two uplink channels in power control.

After the terminal determines the transmit powers of the uplink channels, the terminal sums up the transmit powers of the uplink channels to obtain a sum of the transmit powers of the uplink channels. Then, the terminal determines whether the sum is greater than the maximum transmit power, and if the sum is not greater than the maximum transmit power, sends the uplink channels at the transmit powers of the uplink channels, or if the sum is greater than the maximum transmit power, determines the priorities of the at least two uplink channels in power control based on the power control impact factors corresponding to the uplink channels. Specifically, a longer subcarrier spacing indicates a higher priority of a corresponding uplink channel, and a shorter time length indicates a higher priority of a corresponding uplink channel. A more urgent service corresponding to a service type indicates a higher priority of a corresponding uplink channel.

When the at least two uplink channels correspond to a same subcarrier spacing, the priorities of the uplink channels in power control are determined based on an uplink channel type. A relationship between the uplink channel type and the priority may be configured by the base station for the terminal, and the relationship may be static, or may be semi-static. For example, if a terminal needs to simultaneously send a PBFCH, a PUCCH, a PUSCH, and SRS, and a PRACH in a same subframe, power scaling priorities may be: PBFCH>PRACH>PUCCH>PUSCH>SRS. Alternatively, there may be another possibility. For a priority arrangement manner, no limitation is imposed herein in this embodiment.

Finally, the terminal performs scaling processing on the transmit powers of the at least two uplink channels based on the priorities of the at least two uplink channels in power control.

In a feasible implementation, scaling may be performed on the transmit power of each uplink channel. In a scaling process, the transmit power of each uplink channel may be multiplied by a scaling factor for scaling. The scaling factor is greater than 0 and less than 1. Optionally, a higher priority of an uplink channel corresponds to a larger scaling factor.

In another feasible implementation, a transmit power corresponding to a channel with a highest priority may be subtracted from a total power; then a transmit power corresponding to a channel with a second highest priority is subtracted from a remaining transmit power; and so on, until a remaining transmit power is zero. In this case, a transmit power of an uplink channel may be zero; in other words, the uplink channel is not sent.

Figure 5:
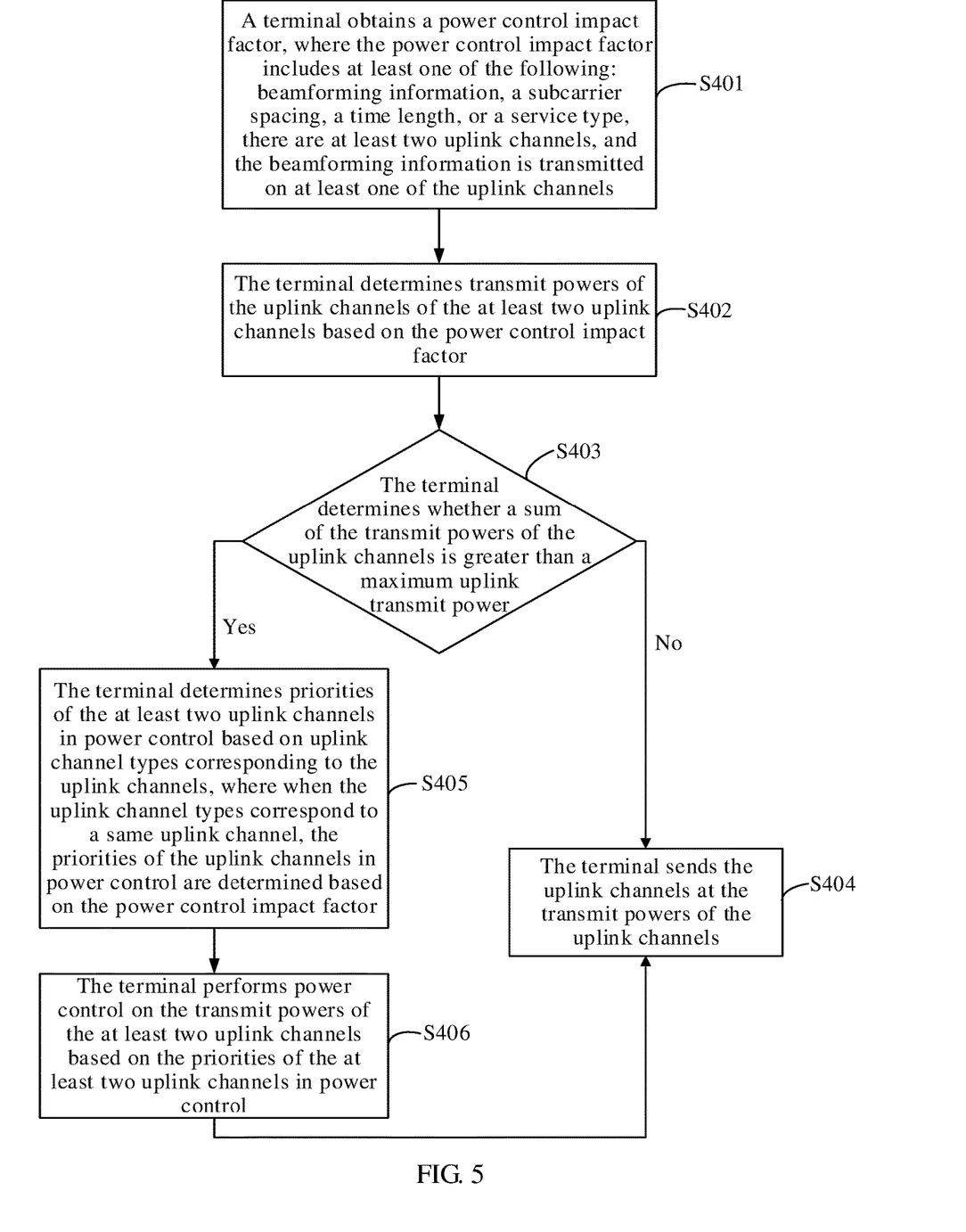
FIG. 5 is a flowchart 4 of an uplink power control method according to an embodiment of this application.

FIG. 5 is a flowchart 4 of an uplink power control method according to an embodiment of this application. As shown in FIG. 5, the method includes the following steps.

S401. A terminal obtains a power control impact factor, where the power control impact factor includes at least one of the following: beamforming information, a subcarrier spacing, a time length, or a service type, there are at least two uplink channels, and the beamforming information is transmitted on at least one of the uplink channels.

S402. The terminal determines transmit powers of the at least two uplink channels based on the power control impact factor.

Implementations of S401 and S402 are similar to the implementations of S301 and S302. Details are not described herein again in this embodiment.

S403. The terminal determines whether a sum of the transmit powers of the uplink channels is greater than a maximum uplink transmit power, and if the sum of the transmit powers of the uplink channels is not greater than the maximum uplink transmit power, go to S404, or if the sum of the transmit powers of the uplink channels is greater than the maximum uplink transmit power, go to S405.

S404. The terminal sends the uplink channels at the transmit powers of the uplink channels.

S405. The terminal determines priorities of the at least two uplink channels in power control based on uplink channel types corresponding to the uplink channels, where when the uplink channel types correspond to a same uplink channel, the priorities of the uplink channels in power control are determined based on the power control impact factor. For details, refer to the description of S305.

S406. The terminal performs power control on the transmit powers of the at least two uplink channels based on the priorities of the at least two uplink channels in power control.

A difference between this embodiment and the embodiment of FIG. 4 is that, in this embodiment, the priorities of the at least two uplink channels in power control are determined first based on the uplink channel types corresponding to the uplink channels. If the uplink channel types correspond a same uplink channel, the priorities of the uplink channels in power control are then determined based on the power control impact factor. For example, the priorities of the uplink channels in power control are determined based on the subcarrier spacing or the time length. After the priorities are determined, a power control process is similar to that in the embodiment of FIG. 4. Details are not described herein again in this embodiment.

The following uses a PBFCH as an example to provide a possible implementation of PBFCH power scaling. If the terminal needs to simultaneously send a PBFCH, a PUCCH, a PUSCH, an SRS, and a PRACH in a same subframe, power limitation may occur. When power limitation occurs, channel power scaling is needed.

Power scaling priorities may be considered as follows: PBFCH>PRACH>PUCCH>PUSCH>SRS.

Alternatively, there may be another possibility. For example, a priority of the PBFCH is between a priority of a PUCCH and a priority of a PUSCH. No limitation is imposed herein in this embodiment.

In this embodiment, that the priority of the PBFCH is between the priority of the PUCCH and the priority of the PUSCH is used as an example for description.

In a possible case, the PBFCH appears on only one carrier of the terminal, such as a primary component carrier. In this case, $\hat{P}_{PBFCH}(i) \leq (\hat{P}_{CMAX}(i) - \hat{P}_{PUCCH}(i))$. $\hat{p}_{PBFCH}(i)$ represents a PBFCH transmit power, $\hat{p}_{CMAX}(i)$ represents a maximum transmit power, and $\hat{p}_{PUCCH}(i)$ represents a PUCCH transmit power.

In another possible case, the PBFCH may appear in a plurality of carriers, and PBFCH powers on the plurality of carriers are scaled with an equal ratio, which may be specifically implemented by using the following formula 14.

$$\sum_c w(i) \cdot \hat{P}_{PBFCH,c}(i) \leq (\hat{P}_{CMAX}(i) - \hat{P}_{PUCCH}(i)) \quad \text{formula 14}$$

$\hat{p}_{PBFCH}(i)$ represents a PBFCH transmit power on each carrier, $\hat{p}_{CMAX}(i)$ represents a maximum transmit power, $\hat{p}_{PUCCH}(i)$ represents a PUCCH transmit power, and w(i) is a scaling factor.

To be specific, scaling is performed on the PBFCH power on each carrier. A sum of powers after the scaling is less than or equal to a difference between the maximum transmit power and the PUCCH transmit power.

This embodiment merely provides a power scaling processing process as an example. A power scaling implementation in another manner may be applied to this embodiment. Details are not described herein in this embodiment.

In this embodiment, scaling processing is performed on the transmit power of the uplink channel, thereby ensuring that an uplink channel with a high priority is sent when a power is limited.

For functions implemented by the terminal, the foregoing describes the solutions provided in the embodiments of this application. It may be understood that, to implement the foregoing functions, the terminal includes a corresponding hardware structure and/or software module for performing the functions. In combination of the example units and algorithm steps of described in the embodiments disclosed in this application, the embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such implementation goes beyond the scope of the technical solutions of the embodiments of this application.

Division of function modules may be performed on the terminal based on the foregoing method examples in the embodiments of this application. For example, the function modules may be divided to correspond to the functions, or two or more functions may be integrated into a processing unit. The foregoing integrated unit may be implemented in a form of hardware, or may be implemented in a form of a software function module. It should be noted that the division of the modules in the embodiments of this application is an example, and is merely logical function division, and there may be another division manner during actual implementation.

Figure 6:
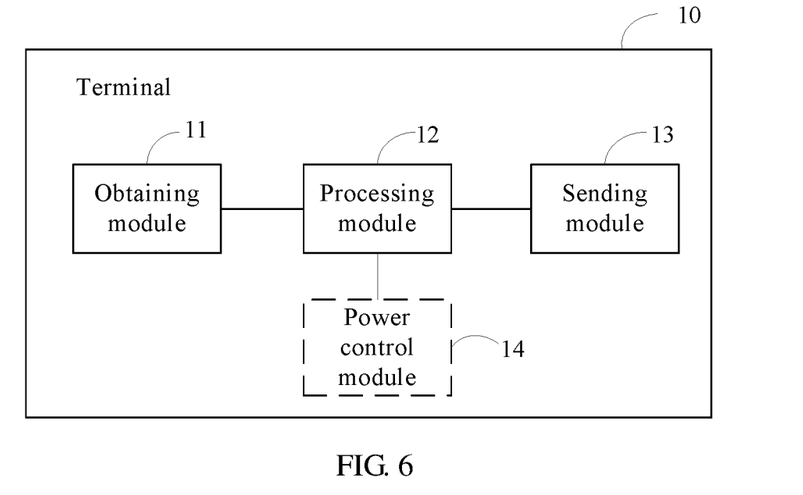
FIG. 6 is a schematic structural diagram of a terminal according to an embodiment of this application.

FIG. 6 is a schematic structural diagram of a terminal according to an embodiment of this application. As shown in FIG. 6, the terminal 10 includes: an obtaining module 11, a processing module 12, a sending module 13, and a power control module 14. The power control module 14 is an optional module.

The obtaining module 11 is configured to obtain a power control impact factor, where the power control impact factor includes at least one of the following: beamforming information, a subcarrier spacing, a time length, or a service type.

The processing module 12 is configured to determine a transmit power of the uplink channel based on the power control impact factor.

The sending module 13 is configured to send the uplink channel at the transmit power of the uplink channel.

Optionally, the processing module 12 is specifically configured to:

determine power control information based on the power control impact factor, where the power control information includes at least one of the following information: a scaling coefficient, an offset, or a power control parameter attribute; and determine the transmit power of the uplink channel based on the power control information.

Optionally, if the power control impact factor includes the beamforming information, the processing module 12 is specifically configured to:

determine power control information based on the beamforming information, where the power control information includes an uplink control information bit function or an uplink control information format function; and determine the transmit power of the uplink channel based on the uplink control information bit function or the uplink control information format function.

Optionally, if the power control impact factor includes the beamforming information and the subcarrier spacing, the processing module 12 is specifically configured to:

determine first power control information based on the beamforming information, where the first power control information includes an uplink control information bit function or an uplink control information format function;

determine second power control information based on the subcarrier spacing, where the second power control information includes at least one of the following information: a scaling coefficient, an offset, or a power control parameter attribute; and determine the transmit power of the uplink channel based on the first power control information and the second power control information.

Optionally, the processing module 12 is specifically configured to:

determine, based on a preset mapping relationship, power control information corresponding to the power control impact factor, where the preset mapping relationship is configured by a base station for the terminal and the preset mapping relationship includes a mapping relationship between different power control impact factors and power control information.

Optionally, if at least two different uplink channels are sent simultaneously and an uplink transmit power is limited, the power control module 14 is configured to determine priorities of the at least two uplink channels in power control based on the power control impact factor; and perform power control on a transmit power of the at least two uplink channels based on the priorities of the at least two uplink channels in power control.

Optionally, if at least two different uplink channels are sent simultaneously and an uplink transmit power is limited, the power control module 14 is configured to: determine priorities of the at least two uplink channels based on an uplink channel type, where when the uplink channels correspond to a same uplink channel type, priorities of the uplink channels in power control are determined based on the power control impact factor; and perform power control on a transmit power of the at least two uplink channels based on the priorities of the at least two uplink channels in power control.

Optionally, when the power control impact factor is the subcarrier spacing, a longer subcarrier spacing indicates a higher priority of a corresponding uplink channel.

Optionally, the power control impact factor is configured by the base station for the terminal.

Optionally, the uplink channel includes at least one of the following channels:

a physical uplink control channel PUCCH, a physical uplink shared channel PUSCH, a physical random access channel PRACH, a sounding reference signal SRS, or a physical beamforming channel PBFCH.

Optionally, if the uplink channel is a physical beamforming channel PBFCH and if the power control impact factor includes beamforming information, an offset determined by the terminal based on the beamforming information is an offset between the PBFCH and a PUCCH; or an offset determined by the terminal based on the beamforming information is an offset between the PBFCH and a PUSCH; or a power headroom of the terminal is obtained through calculation based on a transmit power of the PBFCH.

Optionally, the PBFCH has the highest priority; and/or the PUSCH includes a PUSCH with grant and a PUSCH without grant, and the PUSCH with grant has a higher priority than the PUSCH without grant.

In the foregoing specific implementation of the terminal, the sending module may be implemented as a transmitter. Optionally, when the obtaining module receives the power control impact factor configured by the base station, the obtaining module may be implemented as a receiver. The processing module and the power control module may be implemented as a processor. Optionally, when the obtaining module selects a specific power control impact factor from configured power control impact factors, the obtaining module may be implemented as a processor. Data and program code may be stored in a memory and controlled to be executed by a processor based on a corresponding program instruction.

Figure 7:
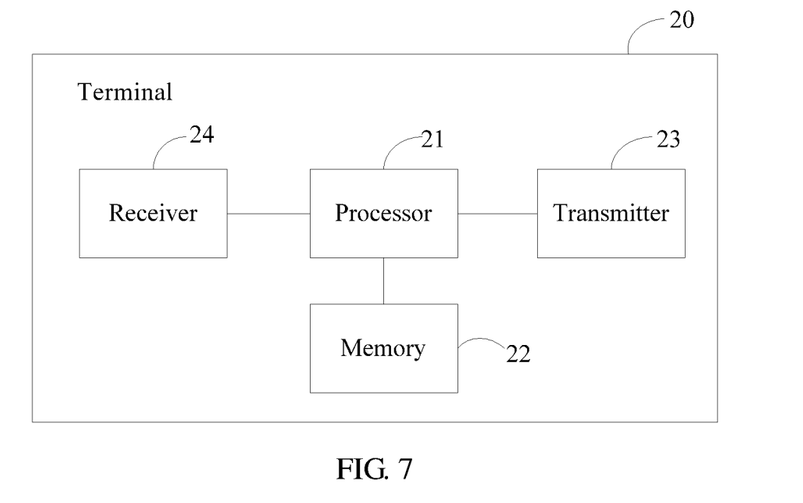
FIG. 7 is a schematic diagram of a hardware structure of a terminal according to an embodiment of this application.

FIG. 7 is a schematic diagram of a hardware structure of a terminal according to an embodiment of this application. As shown in FIG. 7, the terminal 20 includes at least one processor 21, a memory 22, a transmitter 23, and a receiver 24. The memory 22 stores a computer executable instruction; and the at least one processor 21 executes the computer executable instruction stored in the memory 22, so that the terminal 20 can execute the method embodiments shown in FIG. 1 to FIG. 4.

In an example, the receiver 24 receives a power control impact factor or a preset mapping relationship configured by the base station. The processor 21 invokes the computer executable instruction stored in the memory 22, and the processor 21 performs the foregoing steps of S102 in FIGS. 2, S202 and S203 in FIG. 3, S302, S303, S305, and S306 in FIG. 4, and S402, S403, S405, and S406 in FIG. 5. The transmitter 23 performs S103 in FIG. 2, S304 in FIG. 4, and S305 in FIG. 5.

The terminal provided in this embodiment may perform the technical solutions in the foregoing method embodiments. An implementation principle and a technical effect of the terminal are similar to those of the method embodiments. Details are not described herein again in this embodiment.

In addition, an embodiment of this application further provides a computer-readable storage medium, where the computer-readable storage medium stores a computer executable instruction and a terminal implements the uplink power control method provided in the foregoing possible designs when at least one processor of the terminal executes the computer executable instruction.

An embodiment of this application further provides a computer program product, where the computer program product includes a computer executable instruction and the computer executable instruction is stored in a computer-readable storage medium. At least one processor of a terminal may read the computer executable instruction from the computer-readable storage medium, and the at least one processor executes the computer executable instruction so that the terminal implements the uplink power control method provided in the possible designs in the foregoing method embodiments.

A person skilled in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

What is claimed is:

1. A method, comprising:
obtaining, by a terminal, a power control factor, wherein the power control factor comprises at least one of a time length of an uplink channel, beamforming information, or a subcarrier spacing of the uplink channel;
determining, by the terminal, a transmit power of the uplink channel based on the power control factor, wherein the time length of the power control factor is a time length for a resource that carries the uplink channel, wherein the subcarrier spacing of the power control factor is a subcarrier spacing for the resource that carries the uplink channel, and wherein the beamforming information corresponds to an offset as a compensation item for the uplink channel;
determining, by the terminal, priorities of at least two different uplink channels in power control based on the power control factor, wherein the at least two different uplink channels are sent simultaneously and an uplink transmit power is limited, wherein subcarrier spacings are used to determine the priorities of the at least two different uplink channels in power control, and wherein in response to the subcarrier spacings being the same, the beamforming information is further used to determine the priorities of the at least two different uplink channels in power control;

performing, by the terminal, power control on a transmit power of the at least two different uplink channels based on the priorities of the at least two different uplink channels in power control; and sending, by the terminal, the uplink channel at the transmit power of the uplink channel, wherein the uplink channel is one of the at least two different uplink channels.

2. The method according to claim 1, wherein the determining the transmit power of the uplink channel based on the power control factor comprises:

determining, by the terminal, power control information based on the power control factor; and obtaining, by the terminal, the transmit power of the uplink channel based on the power control information.

3. The method according to claim 1, wherein the beamforming information is beamforming indication signaling sent on an uplink channel, or an identifier of a beam in which an uplink channel is located.

4. The method according to claim 3, wherein:

obtaining the transmit power is based on the power control information corresponding to the beamforming information.

5. The method according to claim 4, wherein obtaining the transmit power of the uplink channel based on power control information corresponding to the beamforming information comprises:

searching, based on a preset mapping relationship or a preset protocol table, for the power control information corresponding to the beamforming information, wherein the preset mapping relationship or the preset protocol table includes power control information corresponding to a plurality of beam identifiers; and obtaining, the transmit power of the uplink channel based on the power control information.

6. The method according to claim 1, wherein the uplink channel comprises a physical uplink shared channel (PUSCH), and the power control factor further comprises a PUSCH with grant or a PUSCH without grant.

7. The method according to claim 1, wherein the power control factor further comprises a service type, the method further comprising:

obtaining, by the terminal, the transmit power of the uplink channel based on power control information corresponding to the service type.

8. The method according to claim 1, wherein the time length for the resource that carries the uplink channel is a number of symbols.

9. An apparatus, comprising:

a receiver, configured to obtain a power control factor, wherein the power control factor comprises at least one of a time length of an uplink channel, beamforming information, or a subcarrier spacing of the uplink channel;

at least one processor configured to:

determine a transmit power of the uplink channel based on the power control factor, wherein the time length of the power control factor is a time length for a resource that carries the uplink channel, wherein the subcarrier spacing of the power control factor is a subcarrier spacing for the resource that carries the uplink channel, and wherein the beamforming information corresponds to an offset as a compensation item for the uplink channel;

determine priorities of at least two different uplink channels in power control based on the power control factor, wherein the at least two different uplink channels are sent simultaneously and an uplink transmit power is limited, wherein subcarrier spacings are used to determine the priorities of the at least two different uplink channels in power control, and wherein in response to the subcarrier spacings being the same, the beamforming information is further used to determine the priorities of the at least two different uplink channels in power control; and perform power control on a transmit power of the at least two different uplink channels based on the priorities of the at least two different uplink channels in power control; and a transmitter configured to transmit the uplink channel at the transmit power of the uplink channel, wherein the uplink channel is one of the at least two different uplink channels.

10. The apparatus according to claim 9, wherein the at least one processor is further configured to:

determine power control information based on the power control factor; and obtain the transmit power of the uplink channel based on the power control information.

11. The apparatus according to claim 9, wherein the beamforming information is beamforming indication signaling sent on an uplink channel, or an identifier of a beam in which an uplink channel is located.

12. The apparatus according to claim 11, wherein the at least one processor is further configured to:

obtain the transmit power of the uplink channel based on power control information corresponding to the beamforming information.

13. The apparatus according to claim 9, wherein the uplink channel comprises a physical uplink shared channel (PUSCH) and the power control factor further comprises a PUSCH with grant or a PUSCH without grant.

14. The apparatus according to claim 9, wherein the time length for the resource that carries the uplink channel is a number of symbols.

15. A non-transitory computer readable storage medium storing instructions that, when executed by a computer, cause the computer to perform the following operations:

obtaining a power control factor, wherein the power control factor comprises at least one of a time length of an uplink channel, beamforming information, or a subcarrier spacing of the uplink channel;

determining a transmit power of the uplink channel based on the power control factor, wherein the time length of the power control factor is a time length for a resource that carries the uplink channel, wherein the subcarrier spacing of the power control factor is a subcarrier spacing for the resource that carries the uplink channel, and wherein the beamforming information corresponds to an offset as a compensation item for the uplink channel;

determining priorities of at least two different uplink channels in power control based on the power control factor, wherein the at least two different uplink channels are sent simultaneously and an uplink transmit power is limited, wherein subcarrier spacings are used to determine the priorities of the at least two different uplink channels in power control, and wherein in response to the subcarrier spacings being the same, the beamforming information is further used to determine the priorities of the at least two different uplink channels in power control;

performing power control on a transmit power of the at least two different uplink channels based on the priorities of the at least two different uplink channels in power control; and sending the uplink channel at the transmit power of the uplink channel, wherein the uplink channel is one of the at least two different uplink channels.

16. The non-transitory computer readable storage medium according to claim 15, wherein the beamforming information is beamforming indication signaling sent on an uplink channel, or an identifier of a beam in which an uplink channel is located.

17. The non-transitory computer readable storage medium according to claim 15, wherein executing the instructions by the computer further causes the computer to perform the following operations:

obtaining the transmit power of the uplink channel based on power control information corresponding to the beamforming information.

18. The non-transitory computer readable storage medium according to claim 17, wherein the obtaining the transmit power of the uplink channel based on power control information corresponding to the beamforming information comprises:

searching, based on a preset mapping relationship or a preset protocol table, for the power control information corresponding to the beamforming information, wherein the preset mapping relationship or the preset protocol table includes power control information corresponding to a plurality of beam identifiers; and obtaining the transmit power of the uplink channel based on the power control information.

19. The non-transitory computer readable storage medium according to claim 15, wherein the uplink channel comprises a physical uplink shared channel (PUSCH) and the power control factor further comprises a PUSCH with grant or a PUSCH without grant.

20. The non-transitory computer readable storage medium according to claim 15, wherein the time length for the resource that carries the uplink channel is a number of symbols.

* * * * *